United States Patent
Sakai et al.

(10) Patent No.: US 11,987,675 B2
(45) Date of Patent: May 21, 2024

(54) SHEET (71) Applicant: OJI HOLDINGS CORPORATION, Tokyo (JP)

(72) Inventors: Koh Sakai, Chiba (JP); Hayato Fushimi, Chiba (JP)

(73) Assignee: OJI HOLDINGS CORPORATION, Tokyo (JP)

( * ) Notice: Subject to any disclaimer, the term of this patent is extended or adjusted under 35 U.S.C. 154(b) by 1008 days.

(21) Appl. No.: 16/955,534

(22) PCT Filed: Dec. 18, 2018

(86) PCT No.: PCT/JP2018/046538
§ 371 (c)(1),
(2) Date: Jun. 18, 2020

(87) PCT Pub. No.: WO2019/124364
PCT Pub. Date: Jun. 27, 2019

(65) Prior Publication Data
US 2021/0009771 A1 Jan. 14, 2021

(30) Foreign Application Priority Data

Dec. 19, 2017 (JP) .................................. 2017-242941

(51) Int. Cl.
*D21H 11/20* (2006.01)
*C08J 5/06* (2006.01)
(Continued)

(52) U.S. Cl.
CPC . *C08J 5/18* (2013.01); *C08J 5/06* (2013.01); *C08K 3/24* (2013.01); *C08K 5/092* (2013.01);
(Continued)

(58) Field of Classification Search
CPC ......... D21H 11/20; D21H 17/65; D21H 21/18
See application file for complete search history.

(56) References Cited

U.S. PATENT DOCUMENTS

2018/0282946 A1* 10/2018 Fushimi ................ D21H 17/07
2019/0055697 A1* 2/2019 Sakai .................... D21H 17/37

FOREIGN PATENT DOCUMENTS

CN          106661840 A      5/2017
EP          3 150 762 A1     4/2017
(Continued)

OTHER PUBLICATIONS

Extended European Search Report dated Jul. 30, 2021 in European Application No. 18892660.4.
(Continued)

*Primary Examiner* — Eric Hug
(74) *Attorney, Agent, or Firm* — Sughrue Mion, PLLC

(57) ABSTRACT

It is an object of the present invention to provide an ultrafine cellulose fiber-containing sheet that is excellent in terms of weather resistance. The present invention relates to a sheet comprising cellulose fibers having a fiber width of 1000 nm or less, wherein the cellulose fibers have anionic functional groups, and the YI increase percentage calculated according to the following equation is 1500% or less.

YI increase percentage (%)=(yellowness of the sheet after heating−yellowness of the sheet before heating)/yellowness of the sheet before heating× 100, wherein the yellowness of the sheet after heating is a yellowness measured in accordance with JIS K 7373, after the sheet is subjected to hot pressing at 180° C. at 0.5 MPa for 1 minute, whereas the yellowness of the sheet before heating is a yellowness measured in accordance with JIS K 7373, before the sheet is subjected to the hot pressing.

8 Claims, 2 Drawing Sheets

(51) Int. Cl.
  *C08J 5/18* (2006.01)
  *C08K 3/24* (2006.01)
  *C08K 5/092* (2006.01)
  *D21H 17/65* (2006.01)
  *D21H 21/18* (2006.01)

(52) U.S. Cl.
  CPC ............. *D21H 11/20* (2013.01); *D21H 17/65* (2013.01); *D21H 21/18* (2013.01); *C08J 2329/04* (2013.01); *C08J 2371/02* (2013.01)

(56) References Cited

FOREIGN PATENT DOCUMENTS

| EP | 3 296 458 A1 | 3/2018 | |
|---|---|---|---|
| EP | 3 333 316 A1 | 6/2018 | |
| JP | 2010-222536 A | 10/2010 | |
| JP | 2011-144363 A | 7/2011 | |
| JP | 2017-048293 A | 3/2017 | |
| JP | 2017-052840 A | 3/2017 | |
| JP | 2017-052940 A | 3/2017 | |
| KR | 10-2017-0012306 A | 2/2017 | |
| WO | 2012/067113 A1 | 5/2012 | |
| WO | 2013/137140 A1 | 9/2013 | |
| WO | 2015/182438 A1 | 12/2015 | |
| WO | WO 2017/057578 | * 4/2016 | ............. D21H 17/07 |
| WO | 2016/186055 A1 | 11/2016 | |
| WO | 2017/022848 A1 | 2/2017 | |
| WO | 2017/138589 A1 | 8/2017 | |
| WO | WO 2017/138589 | * 8/2017 | ............. D21H 17/37 |
| WO | 2017/170908 A1 | 10/2017 | |

OTHER PUBLICATIONS

Office Action dated Apr. 19, 2022 from the Chinese Patent Office in Chinese Application No. 201880081987.0.
Communication dated Sep. 9, 2022, issued in Chinese Application No. 201880081987.0.
International Search Report dated Mar. 19, 2019, issued by the International Searching Authority in application No. PCT/JP2018/046538.
Written Opinion dated Mar. 19, 2019, issued by the International Searching Authority in application No. PCT/JP2018/046538.
International Preliminary Report on Patentability with translation of Written Opinion dated Jun. 23, 2020, issued by the International Bureau in application No. PCT/JP2018/046538.
Office Action dated Mar. 1, 2022 in Japanese Application No. 2017-242941.
Chinese Office Action dated Feb. 18, 2023 in Chinese Application No. 201880081987.0.
Office Action dated Aug. 9, 2022 from the Japanese Patent Office in Japanese Application No. 2017-242941.
Office Action dated Oct. 12, 2021, issued by the Korean Intellectual Property Office in Korean application No. 10-2020-7017349.
Office Action dated Nov. 9, 2021, issued by the Japanese Patent Office in Japanese application No. 2017-242941.

* cited by examiner

SHEET

CROSS-REFERENCE TO RELATED APPLICATIONS

This application is a National Stage of International Application No. PCT/JP2018/046538 filed on Dec. 18, 2018, which claims priority under U.S.C. § 119(a) to Japanese Patent Application No. 2017-242941 filed on Dec. 19, 2017, the disclosure of which is incorporated herein in its entirety by reference.

TECHNICAL FIELD

The present invention relates to a sheet. Specifically, the present invention relates to a sheet comprising cellulose fibers.

BACKGROUND ART

In recent years, because of enhanced awareness of alternatives to petroleum resources and environmental consciousness, there has been a focus on materials utilizing reproducible natural fibers. Among natural fibers, cellulose fibers having a fiber diameter of 10 μm or more and 50 μm or less, in particular, wood-derived cellulose fibers (pulp) have been widely used mainly as paper products so far.

Ultrafine cellulose fibers, which have a fiber diameter of 1 μm or less, have also been known as cellulose fibers. In addition, a sheet composed of such ultrafine cellulose fibers, and a composite comprising ultrafine cellulose fibers and a resin, have been developed. Since the contacts of fibers are significantly increased in a sheet or a composite that contains ultrafine cellulose fibers, it has been known that tensile strength and the like are significantly improved in such a sheet or a composite.

For example, Patent Documents 1 to 3 disclose a sheet comprising ultrafine cellulose fibers and a resin. Patent Document 1 discloses a cellulose fiber composite comprising ultrafine cellulose fibers and a matrix, and Patent Document 2 discloses a polyvinyl alcohol film comprising ultrafine cellulose fibers and a polyvinyl alcohol resin. In addition, Patent Document 3 discloses a resin composition comprising one type or two or more types of resins selected from the group consisting of thermoplastic resins, and curable resins selected from an epoxy resin, a (meth)acrylic resin, a phenolic resin, an unsaturated polyester resin, a polyurethane resin and a polyimide resin, and modified cellulose fibers.

Moreover, in Patent Documents 4 to 6, the formation of a sheet from ultrafine cellulose fibers that have been obtained by a predetermined production method is studied. For example, Patent Document 4 discloses a method for producing a cellulose fiber polymer, comprising a defibration step of defibrating a cellulose fiber raw material to obtain defibrated cellulose fibers, and a step of using the defibrated cellulose fibers to obtain a cellulose fiber polymer. Patent Document 5 discloses a method for forming a cellulose nanofiber film, comprising adding an oil component to cellulose nanofibers, to which carboxymethyl cellulose or carboxymethyl cellulose nanofibers have been added, then stirring the mixture using a mixer and/or a churning deaerator, and then drying the reaction mixture. Patent Document 6 discloses a method for producing cellulose, which is characterized in that it comprises a step of allowing raw material cellulose to come into contact with organic acid in water, and a step of defibrating the cellulose. It is to be noted that, in Patent Document 6, raw material cellulose is allowed to come into contact with organic acid before defibration of the cellulose, and after the contact with the organic acid, a washing step is established.

PRIOR ART DOCUMENTS

Patent Documents

Patent Document 1: Japanese Patent Publication No. 2011-144363 A
Patent Document 2: Japanese Patent Publication No. 2017-052840 A
Patent Document 3: Japanese Patent Publication No. 2017-052940 A
Patent Document 4: International Publication No. WO2012/067113 A
Patent Document 5: Japanese Patent Publication No. 2017-048293 A
Patent Document 6: Japanese Patent Publication No. 2010-222536 A

SUMMARY OF INVENTION

Object to be Solved by the Invention

An ultrafine cellulose fiber-containing sheet may be exposed under high temperature and high humidity conditions for a long period of time, depending on storage condition or usage environment. The present inventors have found that deterioration of the ultrafine cellulose fiber-containing sheet is observed in such a case. That is to say, there has been a case where conventional ultrafine cellulose fiber-containing sheets have insufficient weather resistance.

Hence, in order to solve the problem of prior art, the present inventors have conducted studies for the purpose of providing an ultrafine cellulose fiber-containing sheet that is excellent in terms of weather resistance.

Means for Solving the Object

As a result of intensive studies directed towards achieving the aforementioned object, the present inventors have found that a sheet comprising ultrafine cellulose fibers that is excellent in terms of weather resistance can be obtained by setting the YI increase percentage of the sheet to be a predetermined value or less.

Specifically, the present invention has following configurations.

[1] A sheet comprising cellulose fibers having a fiber width of 1000 nm or less, wherein
the cellulose fibers have anionic functional groups, and
the YI increase percentage calculated according to the following equation is 1500% or less:

YI increase percentage (%)=(yellowness of the sheet after heating−yellowness of the sheet before heating)/yellowness of the sheet before heating× 100, wherein the yellowness of the sheet after heating is a yellowness measured in accordance with JIS K 7373, after the sheet is subjected to hot pressing at 180° C. at 0.5 MPa for 1 minute, whereas the yellowness of the sheet before heating is a yellowness measured in accordance with JIS K 7373, before the sheet is subjected to the hot pressing.

[2] The sheet according to [1], wherein the pH of the surface of the sheet is pH 6.00 or more and pH 8.00 or less.
[3] The sheet according to [1] or [2], wherein the haze is 10.0% or less.
[4] The sheet according to any one of [1] to [3], wherein the content of the cellulose fibers is 50% by mass or more, with respect to the total solid mass in the sheet.
[5] The sheet according to any one of [1] to [4], which comprises a resin, wherein the resin is at least one type selected from a polyol resin, a polyether resin, and a cellulose derivative.
[6] The sheet according to any one of [1] to [5], comprising an acid component.
[7] The sheet according to [6], wherein the acid component is at least one type selected from organic acid, inorganic acid, and the salts thereof.
[8] The sheet according to [6] or [7], wherein the content of the acid component is 0.3% by mass or more and 15% by mass or less.

Effects of Invention

According to the present invention, an ultrafine cellulose fiber-containing sheet that is excellent in terms of weather resistance can be obtained.

EMBODIMENTS OF CARRYING OUT THE INVENTION

Hereinafter, the present invention will be described in detail. The description for components described below will be based on representative embodiments or specific examples; however, the present invention will not be limited to such embodiments.
(Ultrafine Cellulose Fiber-Containing Sheet)

The present invention relates to a sheet comprising cellulose fibers having a fiber width of 1000 nm or less, wherein the YI increase percentage calculated according to the following equation is 1500% or less. Herein, the cellulose fibers have anionic functional groups.

YI increase percentage (%)=(yellowness of the sheet after heating−yellowness of the sheet before heating)/yellowness of the sheet before heating× 100, wherein the yellowness of the sheet after heating is a yellowness measured in accordance with JIS K 7373, after the sheet is subjected to hot pressing at 180° C. at 0.5 MPa for 1 minute, whereas the yellowness of the sheet before heating is a yellowness measured in accordance with JIS K 7373, before the sheet is subjected to the hot pressing.

It is to be noted that, in the present description, cellulose fibers having a fiber width of 1000 nm or less are also referred to as ultrafine cellulose fibers.

Since the sheet of the present invention has the above-described configuration, it is excellent in terms of weather resistance. That is, in the case of the sheet of the present invention, deterioration of the sheet is suppressed even in a case where it has been exposed under high temperature and high humidity conditions for a long period of time.

In the sheet of the present invention, the YI increase percentage calculated according to the above-described equation may be 1500% or less, and it is preferably 1400% or less, more preferably 1300% or less, further preferably 1200% or less, still further preferably 1000% or less, and particularly preferably 900% or less. It is to be noted that the YI increase percentage may also be 0%. In the measurement of the yellowness, for example, Colour Cute i (manufactured by Suga Test Instruments Co., Ltd.) can be used. The YI increase percentage can be controlled by appropriately selecting, for example, conditions for producing the sheet. For example, it is considered important to adjust the pH of the surface of the sheet to a suitable value.

The yellowness (YI) of the sheet of the present invention (the sheet before heating) that is measured in accordance with JIS K 7373 is preferably 1.0 or less, and more preferably less than 0.7. On the other hand, the yellowness (YI) of the sheet of the present invention that has been hot-pressed at 180° C. at 0.5 MPa for 1 minute, which is then measured in accordance with JIS K 7373, is preferably 10.0 or less, more preferably 8.0 or less, further preferably 7.5 or less, still further preferably 7.0 or less, and particularly preferably 6.0 or less. It is to be noted that the lower limit value of the yellowness (YI) is not particularly limited, and may also be 0.0.

The ΔYI of the present invention that is calculated according to the following equation is preferably 10.0 or less, more preferably 8.0 or less, further preferably 7.0 or less, and particularly preferably 6.0 or less.

ΔYI=(the yellowness of the sheet after heating)−(the yellowness of the sheet before heating).

In the above equation, the yellowness of the sheet after heating is a yellowness measured in accordance with JIS K 7373, after the sheet has been subjected to hot pressing at 180° C. at 0.5 MPa for 1 minute, whereas the yellowness of the sheet before heating is a yellowness measured in accordance with JIS K 7373, before the sheet is subjected to the hot pressing.

The haze of the sheet of the present invention is preferably 10.0% or less, more preferably 5.0% or less, even more preferably 4.0% or less, further preferably 3.0% or less, still further preferably 2.0% or less, and particularly preferably 1.0% or less. It is to be noted that the lower limit value of the haze of the sheet is not particularly limited, and it may also be 0.0%. By setting the haze of the sheet within the above-described range, a sheet that is more excellent in terms of transparency can be obtained. It is to be noted that the haze of the sheet is a value measured in accordance with JIS K 7136, using, for example, a hazemeter (manufactured by MURAKAMI COLOR RESEARCH LABORATORY Co., Ltd.; HM-150).

The total light transmittance of the sheet of the present invention is preferably 70% or more, more preferably 80% or more, and further preferably 85% or more. It is to be noted that the total light transmittance of the sheet is a value measured in accordance with JIS K 7361, using, for example, a hazemeter (manufactured by MURAKAMI COLOR RESEARCH LABORATORY Co., Ltd.; HM-150).

The pH of the surface of the sheet of the present invention is preferably pH 6.00 or more, more preferably pH 6.20 or more, and further preferably pH 6.30 or more. On the other hand, the pH of the surface of the sheet is preferably pH 8.00 or less. It is to be noted that the pH of the surface of the sheet is a value measured using, for example, a corrected pH meter (manufactured by HORIBA, Ltd., F-53). By setting the pH of the surface of the sheet within the above-described range, the weather resistance of the sheet can be more effectively enhanced.

The content of cellulose fibers with respect to the total solid mass in the sheet of the present invention is preferably 1% by mass or more, more preferably 10% by mass or more, further preferably 20% by mass or more, still further preferably 30% by mass or more, and particularly preferably 50% by mass or more. On the other hand, the content of cellulose fibers with respect to the total solid mass in the sheet is preferably 99% by mass or less.

It is to be noted that the solid content of the sheet of the present invention is preferably 90% by mass or more, more preferably 95% by mass or more, and further preferably 99% by mass or more. It is to be noted that the solid content of the sheet may be 100% by mass. That is to say, it is preferable that the major part of the sheet of the present invention is a solid, and that the content of a solvent is low.

The sheet of the present invention may comprise a solvent. Examples of the solvent may include water and an organic solvent. Examples of the organic solvent may include methanol, ethanol, n-propyl alcohol, isopropyl alcohol (IPA), 1-butanol, m-cresol, glycerin, acetic acid, pyridine, tetrahydrofuran (THF), acetone, methyl ethyl ketone (MEK), ethyl acetate, aniline, N-methyl-2-pyrrolidone (NMP), dimethyl sulfoxide (DMSO), N,N-dimethylformamide (DMF), hexane, cyclohexane, benzene, toluene, p-xylene, diethyl ether, and chloroform. The content of the solvent in the sheet is preferably 10% by mass or less, more preferably 5% by mass or less, and further preferably 1% by mass or less, with respect to the total mass of the sheet.

The thickness of the sheet of the present invention is not particularly limited, and it is preferably 5 µm or more, more preferably 10 µm or more, and further preferably 20 µm or more. On the other hand, the upper limit value of the thickness of the sheet is not particularly limited, and it is preferably 1000 µm or less. The thickness of the sheet can be measured using, for example, a stylus thickness gauge (manufactured by Mahr; Millitron 1202 D).

The basis weight of the sheet of the present invention is not particularly limited, and it is preferably 10 g/m² or more, more preferably 20 g/m² or more, and further preferably 30 g/m² or more. The basis weight of the sheet is not particularly limited, and it is preferably 200 g/m² or less, and more preferably 150 g/m² or less. Herein, the basis weight of the sheet can be calculated, for example, in accordance with JIS P 8124.

The density of the sheet of the present invention is not particularly limited, and for example, it is preferably 0.1 g/cm³ or more, more preferably 0.5 g/cm³ or more, and further preferably 1.0 g/cm³ or more. On the other hand, the density of the sheet is not particularly limited, and for example, it is preferably 5.0 g/cm³ or less, and more preferably 3.0 g/cm³ or less. Herein, the density of the sheet can be measured by subjecting a 50-mm square sheet to humidity conditioning under conditions of 23° C. and a relative humidity of 50% for 24 hours, and then measuring the thickness and mass of the sheet.

(Ultrafine Cellulose Fibers)

The sheet of the present invention comprises cellulose fibers with a fiber width of 1000 nm or less, having anionic functional groups. The fiber width of the cellulose fibers can be measured, for example, by electron microscopic observation.

The average fiber width of the cellulose fibers is, for example, 1000 nm or less. For example, the average fiber width is preferably 2 nm or more and 1000 nm or less, more preferably 2 nm or more and 100 nm or less, further preferably 2 nm or more and 50 nm or less, and particularly preferably 2 nm or more and 10 nm or less. When the average fiber width of the cellulose fibers is set to be 2 nm or more, dissolution of the cellulose fibers as cellulose molecules in water is suppressed, and the effects of the cellulose fibers, such as the improvement of strength, rigidity, and dimensional stability, can be easily expressed. It is to be noted that the cellulose fibers are, for example, monofibrous cellulose.

The average fiber width of cellulose fibers is measured as follows, for example, using an electron microscope. First, an aqueous suspension of cellulose fibers having a concentration of 0.05% by mass or more and 0.1% by mass or less is prepared, and this suspension is casted onto a hydrophilized carbon film-coated grid as a sample for TEM observation. If the sample contains wide fibers, SEM images of the surface of the suspension casted onto glass may be observed. Subsequently, the sample is observed using electron microscope images taken at a magnification of 1000×, 5000×, 10000×, or 50000×, depending on the widths of fibers used as observation targets. However, the sample, the observation conditions, and the magnification are adjusted so as to satisfy the following conditions:

(1) A single straight line X is drawn in any given portion in an observation image, and 20 or more fibers intersect with the straight line X.
(2) A straight line Y, which intersects perpendicularly with the aforementioned straight line in the same image as described above, is drawn, and 20 or more fibers intersect with the straight line Y.

The widths of the fibers intersecting the straight line X and the straight line Y in the observation image meeting the above-described conditions are visually read. Three or more sets of observation images of surface portions, which are at least not overlapped, are obtained. Thereafter, the widths of the fibers intersecting the straight line X and the straight line Y are read in each image. Thereby, at least 120 fiber widths (20 fibers×2×3=120) are thus read. The average value of the read fiber widths is defined to be the average fiber width of cellulose fibers.

The fiber length of the cellulose fibers is not particularly limited, and for example, it is preferably 0.1 µm or more and 1000 µm or less, more preferably 0.1 µm or more and 800 µm or less, and further preferably 0.1 µm or more and 600 µm or less. By setting the fiber length within the above-described range, destruction of the crystalline region of the cellulose fibers can be suppressed. In addition, the viscosity of a slurry of the cellulose fibers can also be set within an appropriate range. It is to be noted that the fiber length of the cellulose fibers can be obtained by an image analysis using TEM, SEM or AFM.

The cellulose fibers preferably have a type I crystal structure. Herein, the fact that the cellulose fibers have a type I crystal structure may be identified by a diffraction profile obtained from a wide angle X-ray diffraction photograph using CuKα (λ=1.5418 Å) monochromatized with graphite. Specifically, it may be identified based on the fact that there are typical peaks at two positions near 2θ=14° or more and 17° or less, and near 2θ=22° or more and 23° or less.

The percentage of the type I crystal structure occupied in the ultrafine cellulose fibers is, for example, preferably 30% or more, more preferably 40% or more, and further preferably 50% or more. Thereby, more excellent performance can be expected, in terms of heat resistance and the expression of low linear thermal expansion. The crystallinity can be obtained by measuring an X-ray diffraction profile and obtaining it according to a common method (Seagal et al., Textile Research Journal, Vol. 29, p. 786, 1959).

The aspect ratio (fiber length/fiber width) of the cellulose fibers is not particularly limited, and for example, it is preferably 20 or more and 10000 or less, and more preferably 50 or more and 1000 or less. By setting the aspect ratio at the above-described lower limit value or more, a sheet comprising ultrafine cellulose fibers is easily formed. Moreover, sufficient thickening properties are easily obtained upon production of a dispersed form in a solvent. By setting the aspect ratio at the above-described upper limit or less, when the cellulose fibers are treated, for example, as an aqueous dispersed solution, operations such as dilution are preferably easily handled.

The cellulose fibers in the present embodiment have, for example, both a crystalline region and an amorphous region. In particular, ultrafine cellulose fibers, which have both a crystalline region and an amorphous region and also have a high aspect ratio, are realized by the after-mentioned method for producing ultrafine cellulose fibers.

The cellulose fibers have anionic functional groups. For example, the anionic functional group is preferably at least one type selected from a phosphoric acid group or a phosphoric acid group-derived substituent (which is also simply referred to as a phosphoric acid group), a carboxyl group or a carboxyl group-derived substituent (which is also simply referred to as a carboxyl group), and a sulfone group or a sulfone group-derived substituent (which is also simply referred to as a sulfone group); more preferably at least one type selected from a phosphoric acid group and a carboxyl group; and particularly preferably a phosphoric acid group. Conventionally, a sheet comprising ultrafine cellulose fibers having anionic functional groups has tended to be colored. In the present invention, however, even in the case of using ultrafine cellulose fibers having anionic functional groups, the YI increase percentage was successfully controlled within a predetermined range, and thereby, a sheet having excellent weather resistance could be obtained.

The phosphoric acid group is a divalent functional group corresponding to, for example, a phosphoric acid from which a hydroxyl group is removed. Specifically, it is a group represented by —$PO_3H_2$. The phosphoric acid group-derived substituents include substituents, such as salts of phosphoric acid groups and phosphoric acid ester groups. Besides, the phosphoric acid group-derived substituents may be comprised as condensed phosphoric acid groups (for example, pyrophosphoric acid groups) in the cellulose fibers.

The phosphoric acid group or the phosphoric acid group-derived substituent may be a substituent represented by, for example, the following Formula (1):

[Formula 1]

(10)

In the above Formula (1), a, b, and n each represent a natural number (provided that a=b×m); an "a" number of $\alpha^1$, $\alpha^2$, ..., $\alpha^n$ and $\alpha'$ is $O^-$, and the rest is either R or OR. All of $\alpha^n$ and $\alpha'$ may also be $O^-$. R each represents a hydrogen atom, a saturated straight chain hydrocarbon group, a saturated branched chain hydrocarbon group, a saturated cyclic hydrocarbon group, an unsaturated straight chain hydrocarbon group, an unsaturated branched chain hydrocarbon group, an unsaturated cyclic hydrocarbon group, an aromatic group, or a derivative group thereof.

Examples of the saturated straight chain hydrocarbon group may include a methyl group, an ethyl group, an n-propyl group, and an n-butyl group, but are not particularly limited thereto. Examples of the saturated branched chain hydrocarbon group may include an i-propyl group and a t-butyl group, but are not particularly limited thereto. Examples of the saturated cyclic hydrocarbon group may include a cyclopentyl group and a cyclohexyl group, but are not particularly limited thereto. Examples of the unsaturated straight chain hydrocarbon group may include a vinyl group and an allyl group, but are not particularly limited thereto. Examples of the unsaturated branched chain hydrocarbon group may include an i-propenyl group and a 3-butenyl group, but are not particularly limited thereto. Examples of the unsaturated cyclic hydrocarbon group may include a cyclopentenyl group and a cyclohexenyl group, but are not particularly limited thereto. Examples of the aromatic group may include a phenyl group and a naphthyl group, but are not particularly limited thereto.

Moreover, examples of the derivative group of the R may include functional groups such as a carboxyl group, a hydroxyl group or an amino group, in which at least one type selected from the functional groups is added to or substituted with the main chain or side chain of the above-described various types of hydrocarbon groups, but are not particularly limited thereto. Furthermore, the number of carbon atoms constituting the main chain of the above-described R is not particularly limited, and it is preferably 20 or less, and more preferably 10 or less. By setting the number of carbon atoms constituting the main chain of the R within the above-described range, the molecular weight of phosphoric acid groups can be adjusted in a suitable range, permeation thereof into a fiber raw material can be facilitated, and the yield of the ultrafine cellulose fibers can also be enhanced.

$\beta^{b+}$ is a mono- or more-valent cation consisting of an organic or inorganic matter. Examples of the mono- or more-valent cation consisting of an organic matter may include an aliphatic ammonium and an aromatic ammonium, and examples of the mono- or more-valent cation consisting of an inorganic matter may include alkali metal ions such as sodium, potassium or lithium ions, divalent metal cations such as calcium or magnesium ions, and hydrogen ions, but are not particularly limited thereto. These can be applied alone as a single type or in combination of two or more types. As such mono- or more-valent cations consisting of an organic or inorganic matter, sodium or potassium ions, which hardly cause the yellowing of a fiber raw material containing β upon heating and are industrially easily applicable, are preferable, but are not particularly limited thereto.

The amount of anionic functional groups introduced into the cellulose fibers is, for example, per 1 g (mass) of the cellulose fibers, preferably 0.10 mmol/g or more, more preferably 0.20 mmol/g or more, further preferably 0.50 mmol/g or more, and particularly preferably 1.00 mmol/g or more. On the other hand, the amount of anionic functional groups introduced into the cellulose fibers is, for example, per 1 g (mass) of the ultrafine cellulose fibers, preferably 3.65 mmol/g or less, more preferably 3.50 mmol/g or less, and further preferably 3.00 mmol/g or less. By setting the amount of anionic functional groups introduced within the above-described range, it can become easy to perform fibrillation on the fiber raw material, and the stability of the cellulose fibers can be enhanced. In addition, by setting the amount of anionic functional groups introduced within the above-described range, favorable properties can be exhibited in a sheet comprising the cellulose fibers, etc.

Herein, the denominator in the unit mmol/g indicates the mass of cellulose fibers, when the counterions of anionic functional groups are hydrogen ions ($H^+$).

The amount of anionic functional groups introduced into the cellulose fibers may be measured, for example, by a conductometric titration method. In the measurement according to the conductometric titration method, while an alkali such as a sodium hydroxide aqueous solution is added to a slurry containing the obtained cellulose fibers, a change in the electrical conductivity is obtained, so that the amount of anionic functional groups introduced is measured.

Figure 1:
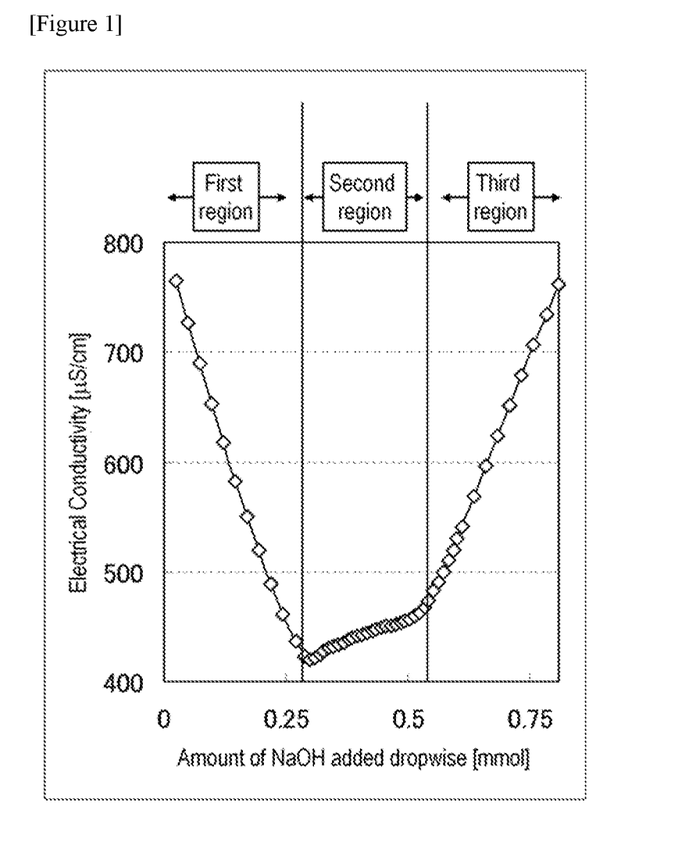
FIG. 1 is a graph showing the relationship between the amount of NaOH added dropwise to a fiber raw material having phosphoric acid groups and the electrical conductivity.

FIG. 1 is a graph showing the relationship between the amount of NaOH added dropwise to cellulose fibers having phosphoric acid groups and electrical conductivity. The amount of the phosphoric acid groups introduced into the cellulose fibers is measured, for example, as follows. First, a slurry containing cellulose fibers is treated with a strongly acidic ion exchange resin. Before the treatment with the strongly acidic ion exchange resin, the same defibration treatment as the after-mentioned defibration treatment may be performed on the cellulose fibers, as necessary. Subsequently, while adding a sodium hydroxide aqueous solution, a change in the electrical conductivity is observed, and a titration curve as shown in FIG. 1 is obtained. As shown in FIG. 1, first, the electrical conductivity is rapidly reduced (hereinafter, this region is referred to as a "first region"). Then, the conductivity starts rising slightly (hereinafter, this region is referred to as a "second region"). Then, the increment of the conductivity is further increased (hereinafter, this region is referred to as a "third region"). The boundary point between the second region and the third region is defined as a point at which a change amount in the two differential values of conductivity, namely, an increase in the conductivity (inclination) becomes maximum. Thus, three regions appear in the titration curve. Among them, the amount of the alkali required for the first region among these regions is equal to the amount of a strongly acidic group in the slurry used in the titration, and the amount of the alkali required for the second region is equal to the amount of a weakly acidic group in the slurry used in the titration. When condensation of a phosphoric acid group occurs, the weakly acidic group is apparently lost, so that the amount of the alkali required for the second region is decreased as compared with the amount of the alkali required for the first region. On the other hand, the amount of the strongly acidic group agrees with the amount of the phosphorus atom regardless of the presence or absence of condensation. Hence, the simple term "the amount of the phosphoric acid group introduced (or the amount of the phosphoric acid group)" or "the amount of the substituent introduced (or the amount of the substituent)" refers to the amount of the strongly acidic group. Therefore, the value obtained by dividing the amount (mmol) of the alkali required for the first region in the titration curve as obtained above by the solid content (g) in the slurry as a titration target becomes the amount (mmol/g) of the phosphoric acid groups introduced.

Figure 2:
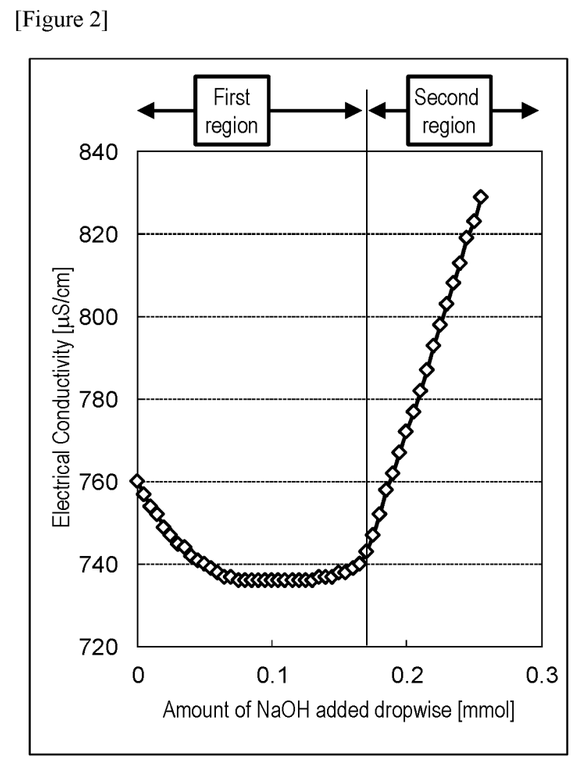
FIG. 2 is a graph showing the relationship between the amount of NaOH added dropwise to a fiber raw material having carboxyl groups and the electrical conductivity.

FIG. 2 is a graph showing the relationship between the amount of NaOH added dropwise to cellulose fibers having carboxyl groups and electrical conductivity. The amount of the carboxyl groups introduced into the cellulose fibers is measured, for example, as follows. First, a slurry containing cellulose fibers is treated with a strongly acidic ion exchange resin. Before the treatment with the strongly acidic ion exchange resin, the same defibration treatment as the after-mentioned defibration treatment may be performed on the cellulose fibers, as necessary. Subsequently, while adding a sodium hydroxide aqueous solution, a change in the electrical conductivity is observed, and a titration curve as shown in FIG. 2 is obtained. As shown in FIG. 2, the titration curve is divided into a first region that corresponds to until an increment (inclination) in the electric conductivity becomes almost constant after the electric conductivity has been reduced, and a second region that corresponds to until an increment (inclination) in the conductivity is increased. It is to be noted that the boundary point between the first region and the second region is defined as a point at which the second-order differential value of the conductivity, namely, the amount of change in the increment (inclination) in the conductivity, becomes maximum. The value obtained by dividing the amount (mmol) of the alkali required for the first region in the titration curve by the solid content (g) in the ultrafine cellulose fiber-containing slurry as a titration target is defined to be the amount (mmol/g) of carboxyl groups introduced.

Regarding the aforementioned amount (mmol/g) of carboxyl groups introduced, since the denominator indicates the mass of acid-type cellulose fibers, the amount (mmol/g) of carboxyl groups introduced indicates the amount of carboxyl groups possessed by the acid-type cellulose fibers (hereinafter referred to as "the amount of carboxyl group (acid type)"). On the other hand, when the counterions of carboxyl groups are substituted with any given cations C to achieve charge equivalent, the denominator is converted to the mass of cellulose fibers in which cations C are counterions, so that the amount of carboxyl groups possessed by the cellulose fibers in which the cations C are counterions (hereinafter referred to as "the amount of carboxyl groups (C type)") can be obtained.

Specifically, the amount of carboxyl groups introduced is calculated according to the following equation:

Amount of carboxyl groups (C type) introduced=amount of carboxyl groups (acid type)/{1+(W−1)×(amount of carboxyl groups (acid type))/1000}.

In the equation, W indicates formula weight per valence of cations C (for example, Na: 23; and Al: 9).

<Step of Producing Ultrafine Cellulose Fibers>
<Fiber Raw Material>

Ultrafine cellulose fibers are produced from a fiber raw material comprising cellulose. Such a fiber raw material comprising cellulose is not particularly limited, and pulp is preferably used from the viewpoint of availability and inexpensiveness. Examples of the pulp may include wood pulp, non-wood pulp, and deinked pulp. Examples of the wood pulp may include, but are not particularly limited to, chemical pulps such as leaf bleached kraft pulp (LBKP), needle bleached kraft pulp (NBKP), sulfite pulp (SP), dissolving pulp (DP), soda pulp (AP), unbleached kraft pulp (UKP), and oxygen bleached kraft pulp (OKP); semichemical pulps such as semi-chemical pulp (SCP) and chemi-ground wood pulp (CGP); and mechanical pulps such as ground pulp (GP) and thermomechanical pulp (TMP, BCTMP). Examples of the non-wood pulp may include, but not particularly limited to, cotton pulps such as cotton linter and cotton lint; and non-wood type pulps such as hemp, wheat straw, and bagasse. An example of a deinked pulp may be, but is not particularly limited to, a deinked pulp using waste paper as a raw material. The pulp of the present embodiment may be used alone as a single type, or in combination of two or more types.

Among the above-listed pulps, for example, wood pulp and deinked pulp are preferable from the viewpoint of easy availability. Moreover, among wood pulps, for example, chemical pulp is more preferable, and kraft pulp and sulfite pulp are further preferable, from the viewpoint that it has a higher cellulose content ratio so as to enhance the yield of ultrafine cellulose fibers upon the defibration treatment, and that decomposition of cellulose in the pulp is mild, so that ultrafine cellulose fibers having a long fiber length with a high aspect ratio can be obtained.

As a fiber raw material comprising cellulose, for example, cellulose comprised in Ascidiacea, or bacterial cellulose generated by acetic acid bacteria can also be utilized. In addition fibers formed from straight-chain nitrogen-containing polysaccharide polymers such as chitin and chitosan can also be used, instead of a fiber raw material containing cellulose.

<Phosphoric Acid Group Introduction Step>

The phosphoric acid group introduction step is a step of reacting at least one compound selected from compounds capable of introducing phosphoric acid groups (hereinafter also referred to as "Compound A") with a hydroxyl group of a fiber raw material comprising cellulose, so that the compound is allowed to act on the fiber raw material comprising cellulose. By this step, phosphoric acid group-introduced fibers can be obtained.

In the phosphoric acid group introduction step according to the present embodiment, the reaction of the fiber raw material comprising cellulose with Compound A may be carried out in the presence of at least one type selected from urea and a derivative thereof (hereinafter also referred to as "Compound B"). Otherwise, the reaction of the fiber raw material comprising cellulose with Compound A may also be carried out in the absence of Compound B.

One example of the method of allowing Compound A to act on the fiber raw material in the presence of Compound B may include a method of mixing Compound A and Compound B into the fiber raw material that is in a dry or wet state, or in a slurry state. Among the fiber raw materials in these states, because of the high uniformity of the reaction, the fiber raw material that is in a dry or wet state is preferably used, and the fiber raw material in a dry state is particularly preferably used. The shape of the fiber raw material is not particularly limited, and for example, a cotton-like or thin sheet-like fiber raw material is preferable. Compound A and Compound B may be added to the fiber raw material by the method of adding Compound A and Compound B that are dissolved in a solvent to form a solution, or are melted by being heated to a melting point or higher. Among these, because of the high uniformity of the reaction, the compounds are preferably added to the fiber raw material, in the form of a solution obtained by dissolution thereof in a solvent, or in particular, in the form of an aqueous solution. Moreover, Compound A and Compound B may be simultaneously added, or may also be added, separately. Alternatively, Compound A and Compound B may be added in the form of a mixture thereof. The method of adding Compound A and Compound B is not particularly limited, and in a case where Compound A and Compound B are in the form of a solution, the fiber raw material may be immersed in the solution for liquid absorption, and may be then removed therefrom, or the solution may also be added dropwise onto the fiber raw material. Otherwise, Compound A and Compound B in necessary amounts may be added to the fiber raw material, or Compound A and Compound B in excessive amounts may be added to the fiber raw material and then, may be squeezed or filtrated to remove redundant Compound A and Compound B.

Examples of Compound A used in the present embodiment may include phosphoric acid or a salt thereof, dehydrated condensed phosphoric acid or a salt thereof, and phosphoric anhydride (diphosphorus pentoxide), but are not particularly limited thereto. As such phosphoric acid, those having various purities can be used, and for example, 100% phosphoric acid (orthophosphoric acid) or 85% phosphoric acid can be used. Dehydrated condensed phosphoric acid is phosphoric acid that is condensed by two or more molecules according to a dehydration reaction, and examples of such dehydrated condensed phosphoric acid may include pyrophosphoric acid and polyphosphoric acid. Examples of the phosphate and salts of dehydrated condensed phosphoric acid may include lithium salts, sodium salts, potassium salts, and ammonium salts of phosphoric acid or dehydrated condensed phosphoric acid, and these salts may have various neutralization degrees. Among these, from the viewpoints of high efficiency in introduction of the phosphoric acid groups, an improving tendency of the defibration efficiency in a defibration step described below, low costs, and industrial applicability, phosphoric acid, sodium salts of phosphoric acid, potassium salts of phosphoric acid, or ammonium salts of phosphoric acid are preferable, and phosphoric acid, sodium dihydrogen phosphate, disodium hydrogen phosphate, or ammonium dihydrogen phosphate is more preferable.

The amount of Compound A added to the fiber raw material is not particularly limited, and for example, if the amount of the Compound A added is converted to a phosphorus atomic weight, the amount of phosphorus atoms added with respect to the fiber raw material (absolute dry mass) is preferably 0.5% by mass or more and 100% by mass or less, more preferably 1% by mass or more and 50% by mass or less, and further preferably 2% by mass or more and 30% by mass or less. By setting the amount of phosphorus atoms added to the fiber raw material within the above-described range, the yield of the ultrafine cellulose fibers can be further improved. On the other hand, by setting the amount of phosphorus atoms added to the fiber raw material to the above-described upper limit value or less, the balance between the effect of improving the yield and costs can be kept.

Compound B used in the present embodiment is at least one type selected from urea and a derivative thereof, as described above. Examples of Compound B may include urea, biuret, 1-phenyl urea, 1-benzyl urea, 1-methyl urea, and 1-ethyl urea. From the viewpoint of the improvement of the uniformity of the reaction, Compound B is preferably used in the form of an aqueous solution. Moreover, from the viewpoint of the further improvement of the uniformity of the reaction, an aqueous solution, in which both Compound A and Compound B are dissolved, is preferably used.

The amount of Compound B added to the fiber raw material (absolute dry mass) is not particularly limited, and for example, it is preferably 1% by mass or more and 500% by mass or less, more preferably 10% by mass or more and 400% by mass or less, and further preferably 100% by mass or more and 350% by mass or less.

In the reaction of the fiber raw material comprising cellulose with Compound A, for example, amides or amines, as well as Compound B, may be comprised in the reaction system. Examples of the amides may include formamide, dimethylformamide, acetamide, and dimethylacetamide. Examples of the amines may include methylamine, ethylamine, trimethylamine, triethylamine, monoethanolamine, diethanolamine, triethanolamine, pyridine, ethylenediamine, and hexamethylenediamine. Among these, particularly, triethylamine is known to work as a favorable reaction catalyst.

In the phosphoric acid group introduction step, after Compound A, etc. is added or mixed into the fiber raw material, a heat treatment is preferable performed on the fiber raw material. For the temperature of such a heat treatment, it is preferable to select a temperature that allows an efficient introduction of phosphoric acid groups, while suppressing the thermal decomposition or hydrolysis reaction of fibers. For example, the heat treatment temperature is preferably 50° C. or higher and 300° C. or lower, more preferably 100° C. or higher and 250° C. or lower, and further preferably 130° C. or higher and 200° C. or lower. In addition, apparatuses having various heating media can be utilized in the heat treatment, and examples of such an apparatus may include a stirring dryer, a rotary dryer, a disk dryer, a roll-type heater, a plate-type heater, a fluidized bed dryer, an airborne dryer, a vacuum dryer, an infrared heating device, a far-infrared heating device, and a microwave heating device.

In the heat treatment according to the present embodiment, a method comprising adding Compound A to a thin sheet-like fiber raw material by impregnation or the like, and then heating the fiber raw material, or a method comprising heating a fiber raw material, while kneading or stirring the fiber raw material and Compound A using a kneader or the like, can be adopted. Thereby, the unevenness in the concentration of the Compound A in the fiber raw material can be suppressed, and phosphoric acid groups can be more uniformly introduced into the surface of cellulose fibers comprised in the fiber raw material. This is considered because, when water molecules move to the surface of the fiber raw material as drying advances, Compound A dissolved therein is attracted to the water molecules due to surface tension and as a result, Compound A also moves to the surface of the fiber raw material (specifically, the unevenness in the concentration of the Compound A occurs), and because such a phenomenon can be suppressed by adopting the aforementioned method.

As a heating device used for the heat treatment, for example, a device capable of always discharging moisture retained by slurry or moisture generated by the dehydration condensation (phosphoric acid esterification) reaction of Compound A with hydroxyl groups, etc. comprised in cellulose or the like in the fiber raw material, to the outside of the device system, is preferable. Such a heating device may be, for example, a ventilation-type oven. By always discharging moisture from the device system, in addition to being able to suppress a hydrolysis reaction of phosphoric acid ester bonds, which is a reverse reaction of the phosphoric acid esterification, the acid hydrolysis of sugar chains in the fibers may also be suppressed. Thus, it becomes possible to obtain ultrafine cellulose fibers with a high axial ratio.

The time for the heat treatment is preferably 1 second or more and 300 minutes or less, more preferably 1 second or more and 1000 seconds or less, and further preferably 10 seconds or more and 800 seconds or less, for example, after moisture has been substantially removed from the fiber raw material. In the present embodiment, by setting the heating temperature and the heating time within an appropriate range, the amount of phosphoric acid groups introduced can be set within a preferred range.

The phosphoric acid group introduction step may be performed at least once, but may also be repeated two or more times. By performing the phosphoric acid group introduction step two or more times, many phosphoric acid groups can be introduced into the fiber raw material. In the present embodiment, as one example of a preferred aspect, the phosphoric acid group introduction step is performed two times.

The amount of phosphoric acid groups introduced into the fiber raw material is, for example, per 1 g (mass) of the ultrafine cellulose fibers, preferably 0.10 mmol/g or more, more preferably 0.20 mmol/g or more, further preferably 0.50 mmol/g or more, and particularly preferably 1.00 mmol/g or more. On the other hand, the amount of phosphoric acid groups introduced into the fiber raw material is, for example, per 1 g (mass) of the ultrafine cellulose fibers, preferably 5.20 mmol/g or less, more preferably 3.65 mmol/g or less, and further preferably 3.00 mmol/g or less. By setting the amount of phosphoric acid groups introduced within the above-described range, it may become easy to perform fibrillation on the fiber raw material, and the stability of the ultrafine cellulose fibers can be enhanced.

<Carboxyl Group Introduction Step>

The carboxyl group introduction step is carried out by performing ozonation, oxidation according to the Fenton method, or an oxidation treatment such as a TEMPO oxidation treatment, or by treating such a fiber raw material comprising cellulose with a compound having a carboxylic acid-derived group or a derivative thereof, or with an acid anhydride of the compound having a carboxylic acid-derived group or a derivative thereof.

Examples of the compound having a carboxylic acid-derived group may include, but are not particularly limited to, dicarboxylic acid compounds such as maleic acid, succinic acid, phthalic acid, fumaric acid, glutaric acid, adipic acid or itaconic acid, and tricarboxylic acid compounds such as citric acid or aconitic acid. In addition, examples of the derivative of the compound having a carboxylic acid-derived group may include, but are not particularly limited to, an imidized product of the acid anhydride of the compound having a carboxyl group and a derivative of the acid anhydride of the compound having a carboxyl group. Examples of the imidized product of the acid anhydride of the compound having a carboxyl group may include, but are not particularly limited to, imidized products of dicarboxylic acid compounds, such as maleimide, succinimide or phthalimide.

Examples of the acid anhydride of the compound having a carboxylic acid-derived group may include, but are not particularly limited to, acid anhydrides of dicarboxylic acid compounds, such as maleic anhydride, succinic anhydride, phthalic anhydride, glutaric anhydride, adipic anhydride, or itaconic anhydride. In addition, examples of the derivative of the acid anhydride of the compound having a carboxylic acid-derived group may include, but are not particularly limited to, acid anhydrides of the compounds having a carboxyl group, in which at least some hydrogen atoms are substituted with substituents such as alkyl groups or phenyl groups, such as dimethylmaleic anhydride, diethylmaleic anhydride, or diphenylmaleic anhydride.

In the case of performing a TEMPO oxidation treatment in the carboxyl group introduction step, the treatment is preferably carried out, for example, under conditions of pH 6 or more and pH 8 or less. Such a treatment is also referred to as a neutral TEMPO oxidation treatment. The neutral TEMPO oxidation treatment can be carried out, for example, by adding pulp used as a fiber raw material, nitroxy radical used as a catalyst, such as TEMPO (2,2,6,6-tetramethylpiperidin-1-oxyl), and sodium hypochlorite used as a sacrifice reagent to a sodium phosphate buffer (pH=6.8). Moreover, by allowing sodium chlorite to coexist in the reaction system, aldehyde generated in the oxidation process can be efficiently oxidized to a carboxyl group.

Moreover, the TEMPO oxidation treatment may be carried out under conditions of pH 10 or more and pH 11 or less. Such a treatment is also referred to as an "alkaline TEMPO oxidation treatment." The alkaline TEMPO oxidation treatment can be carried out, for example, by adding nitroxy radicals such as TEMPO used as a catalyst, sodium bromide used as a co-catalyst, and sodium hypochlorite used as an oxidizer, to pulp as a fiber raw material.

The amount of carboxyl groups introduced into the fiber raw material is different depending on the types of the substituents. When carboxyl groups are introduced, for example, according to TEMPO oxidation, the amount of carboxyl groups introduced is, per 1 g (mass) of the ultrafine cellulose fibers, preferably 0.10 mmol/g or more, more preferably 0.20 mmol/g or more, further preferably 0.50 mmol/g or more, and particularly preferably 0.90 mmol/g or more. On the other hand, the amount of carboxyl groups introduced is, per 1 g (mass) of the ultrafine cellulose fibers, preferably 2.50 mmol/g or less, more preferably 2.20 mmol/g or less, and further preferably 2.00 mmol/g or less. Otherwise, when the substituents are carboxymethyl groups, the amount of carboxyl groups introduced may be, per 1 g (mass) of the ultrafine cellulose fibers, 5.8 mmol/g or less.

<Washing Step>

In the method for producing ultrafine cellulose fibers according to the present embodiment, a washing step may be performed on the phosphoric acid group-introduced fibers, as necessary. The washing step is carried out by washing the phosphoric acid group-introduced fibers, for example, with water or an organic solvent. In addition, the washing step may be performed after each step as described below, and the number of washing operations performed in each washing step is not particularly limited.

<Alkali Treatment Step>

When the ultrafine cellulose fibers are produced, an alkali treatment may be performed on the fiber raw material between the phosphoric acid group introduction step and a defibration treatment step as described below. The method of the alkali treatment is not particularly limited. For example, a method of immersing the phosphoric acid group-introduced fibers in an alkaline solution may be applied.

The alkali compound contained in the alkaline solution is not particularly limited, and it may be an inorganic alkaline compound or an organic alkali compound. In the present embodiment, because of high versatility, for example, sodium hydroxide or potassium hydroxide is preferably used as an alkaline compound. In addition, the solvent contained in the alkaline solution may be either water or an organic solvent. Among others, the solvent contained in the alkaline solution is preferably water, or a polar solvent including a polar organic solvent such as alcohol, and is more preferably an aqueous solvent containing at least water. As an alkaline solution, for example, a sodium hydroxide aqueous solution or a potassium hydroxide aqueous solution is preferable, because of high versatility.

The temperature of the alkali solution in the alkali treatment step is not particularly limited, and for example, it is preferably 5° C. or higher and 80° C. or lower, and more preferably 10° C. or higher and 60° C. or lower. The time for immersion of the phosphoric acid group-introduced fibers in the alkali solution in the alkali treatment step is not particularly limited, and for example, it is preferably 5 minutes or more and 30 minutes or less, and more preferably 10 minutes or more and 20 minutes or less. The amount of the alkali solution used in the alkali treatment is not particularly limited, and for example, it is preferably 100% by mass or more and 100000% by mass or less, and more preferably 1000% by mass and 10000% by mass or less, with respect to the absolute dry mass of the phosphoric acid group-introduced fibers.

In order to reduce the amount of the alkaline solution used in the alkali treatment step, the phosphoric acid group-introduced fibers may be washed with water or an organic solvent after the phosphoric acid group introduction step and before the alkali treatment step. After the alkali treatment step and before the defibration step, the alkali-treated phosphoric acid group-introduced fibers are preferably washed with water or an organic solvent, from the viewpoint of the improvement of the handling ability.

<Acid Treatment Step>

When ultrafine cellulose fibers are produced, an acid treatment may be performed on the fiber raw material between the step of introducing phosphoric acid groups into the fiber raw material and the after-mentioned defibration treatment step. For example, a phosphoric acid group introduction step, an acid treatment, an alkali treatment, and a defibration treatment may be performed in this order.

Such an acid treatment method is not particularly limited, and for example, a method of immersing the fiber raw material in an acid solution containing an acid may be applied. The concentration of the used acid solution is not particularly limited, and for example, it is preferably 10% by mass or less, and more preferably 5% by mass or less. In addition, the pH of the used acid solution is not particularly limited, and for example, it is preferably a pH value of 0 or more and 4 or less, and more preferably a pH value of 1 or more and 3 or less. Examples of the acid contained in the acid solution that can be used herein may include inorganic acid, sulfonic acid, and carboxylic acid. Examples of the inorganic acid may include sulfuric acid, nitric acid, hydrochloric acid, hydrobromic acid, hydroiodic acid, hypochlorous acid, chlorous acid, chloric acid, perchloric acid, phosphoric acid, and boric acid. Examples of the sulfonic acid may include methanesulfonic acid, ethanesulfonic acid, benzenesulfonic acid, p-toluenesulfonic acid, and trifluoromethanesulfonic acid. Examples of the carboxylic acid may include formic acid, acetic acid, citric acid, gluconic acid, lactic acid, oxalic acid, and tartaric acid. Among these acids, it is particularly preferable to use hydrochloric acid or sulfuric acid.

The temperature of the acid solution used in the acid treatment is not particularly limited, and for example, it is preferably 5° C. or higher and 100° C. or lower, and more preferably 20° C. or higher and 90° C. or lower. The time for immersion of the fiber raw material in the acid solution in the acid treatment is not particularly limited, and for example, it is preferably 5 minutes or more and 120 minutes or less, and more preferably 10 minutes or more and 60 minutes or less. The amount of the acid solution used in the acid treatment is not particularly limited, and for example, it is preferably 100% by mass or more and 100000% by mass or less, and more preferably 1000% by mass or more and 10000% by mass or less, with respect to the absolute dry mass of the fiber raw material.

<Defibration Treatment>

By performing a defibration treatment on the phosphoric acid group-introduced fibers in a defibration treatment step, ultrafine cellulose fibers are obtained. In the defibration treatment step, for example, a defibration treatment apparatus can be used. Such a defibration treatment apparatus is not particularly limited, and for example, a high-speed defibrator, a grinder (stone mill-type crusher), a high-pressure homogenizer, an ultrahigh-pressure homogenizer, a high-pressure collision-type crusher, a ball mill, a bead mill, a disc-type refiner, a conical refiner, a twin-screw kneader, an oscillation mill, a homomixer under high-speed rotation, an ultrasonic disperser, a beater or the like can be used. Among the above-described defibration treatment apparatuses, it is more preferable to use a high-speed defibrator, a high-pressure homogenizer, and an ultrahigh-pressure homogenizer, which are less affected by milling media, and are less likely to be contaminated.

In the defibration treatment step, for example, the phosphoric acid group-introduced fibers are preferably diluted with a dispersion medium to form a slurry. As a dispersion medium, water, and one type or two or more types selected from organic solvents such as polar organic solvents can be used. The polar organic solvent is not particularly limited, and for example, alcohols, polyhydric alcohols, ketones, ethers, esters, aprotic polar solvents, etc. are preferable. Examples of the alcohols may include methanol, ethanol, isopropanol, n-butanol, and isobutyl alcohol. Examples of the polyhydric alcohols may include ethylene glycol, propylene glycol, and glycerin. Examples of the ketones may include acetone and methyl ethyl ketone (MEK). Examples of the ethers may include diethyl ether, tetrahydrofuran, ethylene glycol monomethyl ether, ethylene glycol monoethyl ether, ethylene glycol mono n-butyl ether, and propylene glycol monomethyl ether. Examples of the esters may include ethyl acetate and butyl acetate. Examples of the aprotic polar solvents may include dimethyl sulfoxide (DMSO), dimethylformamide (DMF), dimethylacetamide (DMAc), and N-methyl-2-pyrrolidinone (NMP).

The solid concentration of the ultrafine cellulose fibers upon the defibration treatment can be determined, as appropriate. In addition, in a slurry obtained by dispersing the phosphoric acid group-introduced fibers in a dispersion medium, solids other than the phosphoric acid group-introduced fibers, such as hydrogen-binding urea, may be comprised.

As described above, a slurry containing ultrafine cellulose fibers can be obtained. The solid concentration in the slurry can be controlled, as appropriate, and for example, the solid concentration is preferably 0.1% by mass or more, and more preferably 0.5% by mass or more. On the other hand, the solid concentration is preferably 50% by mass or less, and more preferably 40% by mass or less.

(Acid Component)

The sheet of the present invention may comprise an acid component. By allowing the sheet to comprise such an acid component, the aforementioned YI increase percentage of the sheet is easily controlled within a predetermined range. In addition, by allowing the sheet to comprise such an acid component, the pH of the surface of the sheet is easily controlled within a pH range of pH 6.00 or more and pH 8.00 or less. Thereby, the weather resistance of the sheet is further enhanced.

The acid component is preferably added to the sheet, so that the pH of the surface of the sheet becomes pH 6.00 or more and pH 8.00 or less. For example, the content of the acid component in the sheet is preferably 0.3% by mass or more, and more preferably 0.5% by mass or more. On the other hand, the content of the acid component in the sheet is preferably 15% by mass or less, and more preferably 10% by mass or less. The pH of the surface of the sheet is also adjusted by appropriately selecting production conditions. For example, it is preferable to adopt conditions under which an acid component is added to a slurry before sheet formation, and a sheet is then formed so that the acid content is allowed to remain in the sheet. It is to be noted that the above-described content of the acid component is the content of an acid component that remains in the sheet obtained through the sheet formation step. The content of the acid portion can be quantified, for example, by ion chromatography.

The acid component is preferably at least one type selected from organic acid, inorganic acid, and the salts thereof. The acid component may be of one type, or of two or more types that are used in combination. By allowing the sheet to comprise the above-described acid as an acid component, the weather resistance of the sheet can be more effectively enhanced.

The acid component preferably comprises at least one type selected from organic acids and organic acid salts. Examples of the organic acid may include formic acid, acetic acid, propionic acid, butanoic acid, pentanoic acid, hexanoic acid, stearic acid, oleic acid, naphthenic acid, octylic acid, octanoic acid, benzoic acid, decanoic acid, toluic acid, butyric acid, palmitic acid, myristic acid, lauric acid, linoleate, linolenic acid, ricinoleic acid, oxalic acid, malonic acid, succinic acid, maleic acid, fumaric acid, phthalic acid, glutaric acid, adipic acid, tartaric acid, citric acid, pyruvic acid, and malic acid. Examples of the organic acid salt may include the salts of the above-described organic acids. Specific examples of the organic acid salts may include sodium salts, potassium salts, lithium salts, magnesium salts, aluminum salts, and calcium salts. Among these, the acid component more preferably comprises at least one type selected from citric acid, tartaric acid, malic acid, acetic acid, and the salts thereof.

Also, the acid component preferably comprises at least one type selected from inorganic acids and inorganic acid salts. Examples of the inorganic acid may include sulfuric acid, hydrochloric acid, nitric acid, phosphoric acid, carboxylic acid, silicic acid, and boric acid. Examples of the inorganic acid salt may include the salts of the above-described inorganic acids. Specific examples of the inorganic acid salts may include sodium salts, potassium salts, lithium salts, magnesium salts, aluminum salts, and calcium salts. Among these, the acid component more preferably comprises at least one type selected from phosphoric acid, hydrochloric acid, sulfuric acid, and the salts thereof.

The acid component is preferably strong acid, and is more preferably an acid component having high solubility in water. It is to be noted that the additive amount of the acid component is preferably adjusted, as appropriate, depending on the pH or solubility of the acid component. Moreover, the acid component preferably does not contain polyvalent metal salts, and in such a case, the haze value of the sheet is easily suppressed.

(Optional Component)

The sheet of the present invention preferably comprises a resin. Examples of such a resin may include an acrylic resin, a polycarbonate resin, a polyester resin, a polyamide resin, a silicone resin, a fluorine resin, a chlorine resin, an epoxy resin, a melamine resin, a phenolic resin, a polyurethane resin, a diallyl phthalate resin, a polyol resin, a polyether resin, a cellulose derivative, and a polyethylene resin.

Among these, the sheet of the present invention preferably comprises at least one type selected from a polyol resin, a polyether resin, and a cellulose derivative. In the sheet of the present invention, even in the case of using a resin type easily causing discoloration, such as a polyol resin, a polyether resin or a cellulose derivative, the YI increase percentage of the sheet can be suppressed within a predetermined range, and thereby, the weather resistance of the sheet can be enhanced.

The cellulose fiber-containing resin composition of the present invention may further comprise a water-soluble polymer as a resin that is different from the aforementioned resin type. Examples of the water-soluble polymer may include thickening polysaccharides, such as xanthan gum, guar gum, tamarind gum, carrageenan, locust bean gum, quince seed, alginic acid, pullulan, carrageenan, and pectin; starches, such as cationized starch, raw starch, oxidized starch, etherified starch, esterified starch, and amylose; glycerins, such as glycerin, diglycerin, and polyglycerin; and hyaluronic acid and a metal salt of hyaluronic acid.

The content of the resin in the sheet is preferably 1% by mass or more, more preferably 5% by mass or more, and further preferably 10% by mass or more, with respect to the total solid mass in the sheet. On the other hand, the content of the resin in the sheet is preferably 99% by mass or less, more preferably 95% by mass or less, and further preferably 90% by mass or less, with respect to the total solid mass in the sheet.

Examples of other optional components may include surfactants, organic ions, coupling agents, inorganic layered compounds, inorganic compounds, leveling agents, antiseptics, antifoaming agents, organic particles, lubricants, antistatic agents, ultraviolet protectors, dyes, pigments, stabilizers, magnetic powders, orientation promoters, plasticizers, dispersing agents, and crosslinkers. The sheet of the present invention may comprise one type or two or more types selected from the above-described components.

The content of the above-described components in the sheet is preferably 40% by mass or less, more preferably 30% by mass or less, and further preferably 20% by mass or less, with respect to the total solid mass in the sheet.

(Step of Producing Sheet)

The step of producing a sheet comprises a step of obtaining a slurry comprising ultrafine cellulose fibers, and a coating step of applying the slurry onto a base material, or a papermaking step of making paper from the slurry. Thereby, a sheet comprising ultrafine cellulose fibers can be obtained. Among others, the step of producing a sheet preferably comprises a step of obtaining a slurry comprising ultrafine cellulose fibers, and a coating step of applying the slurry onto a base material.

In the step of obtaining a slurry comprising ultrafine cellulose fibers, an acid component is preferably added into the slurry. Thereby, the pH of the slurry is preferably adjusted to pH 6.00 or more and pH 8.50 or less. Specifically, the step of obtaining a slurry comprising ultrafine cellulose fibers preferably comprises a step of adding an acid component to the ultrafine cellulose fiber-containing slurry to adjust the pH value thereof to pH 6.00 or more and pH 8.50 or less. The additive amount of the acid component can be changed, as appropriate, depending on the pH of the ultrafine cellulose fiber-containing slurry or the type of the acid component added. The acid component is preferably added, so that the pH of the slurry comprising the acid component becomes pH 6.00 or more and pH 8.50 or less. By adding the acid component to the slurry that is to be subjected to sheet formation, the acid component is also comprised in the sheet, and thereby, the weather resistance of the sheet can be more effectively enhanced. It is to be noted that, in the sheet formation step, it is preferable to adopt conditions under which the acid component added into the slurry also remains in the sheet.

In a case where a resin is comprised in the sheet, a resin solution is preferably added in the step of obtaining a slurry comprising ultrafine cellulose fibers. The resin solution may be either an aqueous solution in which the resin is mixed with water, or a solution in which the resin is mixed with an organic solvent. Moreover, after addition of the resin solution, the slurry may be heated, so that the dispersibility of the resin component may be enhanced.

<Coating Step>

In the coating step, for example, the slurry comprising ultrafine cellulose fibers is applied onto a base material, and is then dried to form a sheet, which is then detached from the base material, so as to obtain a sheet. In addition, using a coating apparatus and a long base material, the sheets can be continuously produced.

The material of the base material used in the coating step is not particularly limited. Although a base material having higher wettability to the composition (slurry) is preferable because shrinkage of the sheet or the like upon drying is suppressed, it is preferable to select one from which a sheet formed after drying can be easily detached. Of these, a resin film or plate, or a metal film or plate is preferable, but is not particularly limited thereto. Examples of the base material that can be used herein include: resin films or plates, such as those made of acrylic acid, polyethylene terephthalate, vinyl chloride, polystyrene, or polyvinylidene chloride; metal films or plates, such as those made of aluminum, zinc, copper, or iron; these films or plates obtained by the oxidation treatment of surface thereof; and stainless steel films or plates and brass films or plates.

When the slurry has a low viscosity and spreads on the base material in the coating step, a damming frame may be fixed and used on the base material in order to obtain a sheet having a predetermined thickness and basis weight. The damming frame is not particularly limited, and for example, it is preferable to select ones from which the edges of the sheet adhering thereto after drying can be easily detached. From such a viewpoint, frames formed from resin plates or metal plates are more preferable. In the present embodiment, examples of the frames that can be used herein may include frames formed from resin plates, such as an acryl plate, a polyethylene terephthalate plate, a vinyl chloride plate, a polystyrene plate, or a polyvinylidene chloride plate; frames formed from metal plates, such as an aluminum plate, a zinc plate, a copper plate, or an iron plate; frames formed from these plates, surfaces of which have been subjected to an oxidation treatment; and frames molded from stainless steel plates, brass plates, etc.

A coater for applying the slurry onto the base material is not particularly limited, and examples of such a coater that can be used herein may include roll coaters, gravure coaters, die coaters, curtain coaters, and air doctor coaters. Among these, die coaters, curtain coaters, and spray coaters are particularly preferable because these coaters can provide more even thickness to the sheet.

The slurry temperature and the ambient temperature applied upon application of the slurry onto the base material are not particularly limited, and for example, the temperatures are preferably 5° C. or higher and 80° C. or lower, more preferably 10° C. or higher and 60° C. or lower, further preferably 15° C. or higher and 50° C. or lower, and particularly preferably 20° C. or higher and 40° C. or lower.

When the coating temperature is equal to or higher than the above-described lower limit value, it is possible to easily apply the slurry onto the base material. When the coating temperature is equal to or lower than the above-described upper limit value, it is possible to suppress volatilization of the dispersion medium during the coating.

In the coating step, it is preferable to apply the slurry onto the base material, so that the finished basis weight of the sheet becomes preferably 10 g/m² or more and 200 g/m² or less, and more preferably 20 g/m² or more and 150 g/m² or less. By applying the slurry so that the basis weight can be within the above-described range, a sheet having excellent strength can be obtained.

As described above, the coating step comprises a step of drying the slurry applied onto the base material. The step of drying the slurry is not particularly limited, and for example, a contactless drying method or a method of drying the sheet while locking the sheet, or a combination of these methods may be applied. The contactless drying method is not particularly limited, and for example, a method for drying by heating with hot air, infrared radiation, far-infrared radiation, or near-infrared radiation (a drying method by heating) or a method for drying in vacuum (a vacuum drying method) can be applied. Although the drying method by heating and the vacuum drying method may be combined with each other, the drying method by heating is usually applied. The drying with infrared radiation, far-infrared radiation, or near-infrared radiation is not particularly limited, and for example, it can be performed using an infrared apparatus, a far-infrared apparatus, or a near-infrared apparatus. The heating temperature applied in the drying method by heating is not particularly limited, and it is preferably 20° C. or higher and 150° C. or lower, and more preferably 25° C. or higher and 105° C. or lower. If the heating temperature is set to be equal to or higher than the above-described lower limit value, the dispersion medium can be rapidly volatilized. On the other hand, if the heating temperature is set to be equal to or lower than the above-described upper limit value, reduction in costs required for the heating and suppression of the thermal discoloration of the cellulose fibers can be realized.

<Papermaking Step>

The papermaking step is carried out by making a paper from a slurry using a paper machine. The paper machine used in the papermaking step is not particularly limited, and examples thereof may include continuous paper machines such as a Fourdrinier paper machine, a cylinder paper machine, and an inclined paper machine, and a multilayer combination paper machine, which is a combination thereof. A known papermaking method, such as papermaking by hand, may be adopted in the papermaking step.

The papermaking step is carried out by subjecting the slurry to wire-filtration and dehydration to obtain a sheet that is in a wet state, and then pressing and drying this sheet. The filter fabric used in the filtration and dehydration of the slurry is not particularly limited, and for example, a filter fabric, through which cellulose fibers do not pass and the filtration speed is not excessively slow, is more preferable. Such filter fabric is not particularly limited, and for example, a sheet, a woven fabric, or a porous membrane, each consisting of an organic polymer, is preferable. Preferred examples of the organic polymer may include, but are not particularly limited to, non-cellulose organic polymers such as polyethylene terephthalate, polyethylene, polypropylene, and polytetrafluoroethylene (PTFE). In the present embodiment, examples of the filter fabric may include a polytetrafluoroethylene porous membrane having a pore size of 0.1 µm or more and 20 µm or less, and a woven fabric made of polyethylene terephthalate or polyethylene having a pore size of 0.1 µm or more and 20 µm or less.

In the sheet formation step, the method for producing a sheet from a slurry can be carried out, for example, using a production apparatus comprising a dewatering section for ejecting the slurry comprising ultrafine cellulose fibers onto the upper surface of an endless belt and then dewatering a dispersion medium contained in the ejected slurry to form a web, and a drying section for drying the web to produce a sheet. The endless belt is provided across from the dewatering section to the drying section, and the web formed in the dewatering section is transferred to the drying section while being placed on the endless belt.

The dehydration method used in the papermaking step is not particularly limited, and for example, a dehydration method conventionally used for paper production may be applied. Among others, a method comprising performing dehydration using a Fourdrinier, cylinder, tilted wire, or the like and then performing dehydration using a roll press is preferable. In addition, the drying method used in the papermaking step is not particularly limited, and for example, a drying method used for paper production may be applied. Among others, a drying method using a cylinder dryer, a Yankee dryer, hot air drying, a near-infrared heater, or an infrared heater is more preferable.

(Laminate)

The present invention may relate to a laminate having a structure in which an additional layer is laminated on the aforementioned sheet. Such an additional layer may be provided on both surfaces of the sheet, or may also be provided on only one surface of the sheet. Examples of the additional layer that is laminated on at least one surface of the sheet may include a resin layer and an inorganic layer.

<Resin Layer>

The resin layer is a layer comprising a natural resin or a synthetic resin as a main component. In this context, the main component refers to a component comprised in 50% by mass or more, based on the total mass of the resin layer. The content of the resin is preferably 60% by mass or more, more preferably 70% by mass or more, further preferably 80% by mass or more, and particularly preferably 90% by mass or more, based on the total mass of the resin layer. It is to be noted that the content of the resin may be set at 100% by mass, or may also be set at 95% by mass or less.

Examples of natural resins may include rosin-based resins, such as rosin, rosin ester and hydrated rosin ester.

The synthetic resin is preferably at least one selected from, for example, polycarbonate resins, polyethylene terephthalate resins, polyethylene naphthalate resins, polyethylene resins, polypropylene resins, polyimide resins, polystyrene resins, and acrylic resins. Among them, the synthetic resin is preferably at least one selected from polycarbonate resins and acrylic resins, and more preferably a polycarbonate resin. It is to be noted that the acrylic resin is preferably at least any one type selected from polyacrylonitrile and poly(meth)acrylate.

Examples of the polycarbonate resin, which constitutes the resin layer, may include aromatic polycarbonate-based resins and aliphatic polycarbonate-based resins. These specific polycarbonate-based resins are known, and for example, the polycarbonate-based resin described in JP Patent Publication No. 2010-023275 A may be included.

One type of resin that constitutes the resin layer may be used alone, or a copolymer obtained by copolymerization or graft polymerization of a plurality of resin components may be used. Alternatively, a plurality of resin components may be mixed by a physical process and may be then used as a blend material.

An adhesive layer may be provided between the sheet and the resin layer, or the sheet and the resin layer may directly adhere to each other without providing an adhesive layer. When an adhesive layer is provided between the sheet and the resin layer, examples of adhesives, which constitute the adhesive layer, may include acrylic resins. Examples of adhesives other than acrylic resins may include vinyl chloride resins, (meth)acrylic acid ester resins, styrene/acrylic acid ester copolymer resins, vinyl acetate resins, vinyl acetate/(meth)acrylic acid ester copolymer resins, urethane resins, silicone resins, epoxy resins, ethylene/vinyl acetate copolymer resins, polyester-based resins, polyvinyl alcohol resins, ethylene vinyl alcohol copolymer resins, and rubber-based emulsions such as SBR and NBR.

When no adhesive layer is provided between the sheet and the resin layer, the resin layer may have an adhesion aid, or the surface of the resin layer may be surface-treated by a hydrophilization treatment or the like.

Examples of the adhesion aid may include, for example, compounds containing at least one selected from an isocyanate group, a carbodiimide group, an epoxy group, an oxazoline group, an amino group and a silanol group, and organic silicon compounds. Among them, the adhesion aid is preferably at least one selected from a compound containing an isocyanate group (isocyanate compound) and an organic silicon compound. Examples of the organic silicon compound may include, for example, silane coupling agent condensates and silane coupling agents.

Examples of the surface treatment method may include a corona treatment, a plasma discharge treatment, a UV irradiation treatment, an electron beam irradiation treatment, and a flame treatment.

<Inorganic Layer>

Substances constituting the inorganic layer are not particularly limited, and examples thereof may include aluminum, silicon, magnesium, zinc, tin, nickel, and titanium; oxides, carbides, nitrides, oxycarbides, oxynitrides, and oxycarbonitrides thereof; and mixtures thereof. From the viewpoint that high moisture resistance can be stably maintained, silicon oxide, silicon nitride, silicon oxycarbide, silicon oxynitride, silicon oxycarbonitride, aluminum oxide, aluminum nitride, aluminum oxycarbide, aluminum oxynitride, or mixtures thereof are preferable.

The method for forming an inorganic layer is not particularly limited. In general, methods of forming a thin film are roughly classified into Chemical Vapor Deposition (CVD) and Physical Vapor Deposition (PVD), either of which may be employed. Specific examples of CVD methods may include plasma CVD, which utilizes plasma, and Catalyst Chemical Vapor Deposition (Cat-CVD) including catalytically cracking material gas using a heated catalyzer. Specific examples of PVD methods may include vacuum deposition, ion plating, and sputtering.

As a method for forming an inorganic layer, Atomic Layer Deposition (ALD) can also be employed. The ALD method is a method for forming a thin film in an atomic layer unit by alternately supplying each of source gases of elements constituting the film to be formed to the surface on which a layer is to be formed. Although this method is disadvantageous in terms of a slow deposition rate, it can more smoothly cover even a surface having a complicated shape than the plasma CVD method and has the advantage that a thin film having fewer defects can be formed. The ALD method also has the advantage that this method can control a film thickness at a nano order and can relatively easily cover a wide surface, for example. The ALD method can be further expected to improve a reaction rate, to achieve a low-temperature process, and to decrease unreacted gas, by using plasma.

(Molded Body)

The present invention may relate to a molded body formed from the aforementioned sheet. The molded body formed from the sheet of the present invention has excellent bending elastic modulus and further has strength and dimensional stability. In addition, the molded body formed from the sheet of the present invention is also excellent in terms of transparency.

(Intended use)

The sheet of the present invention is suitable for intended uses such as light transmissive substrates for various display devices, various solar cells, and the like. In addition, the sheet of the present invention is also suitable for intended uses, such as substrates of electronic devices, separators for electrochemical devices, components of consumer electronics, window materials of various types of vehicles or buildings, interior materials, exterior materials, and wrapping materials. Moreover, the cellulose-containing film of the present invention is also suitable for intended uses, such as threads, filters, woven fabrics, buffering materials, sponges, and polishing materials, and also, other intended uses, in which the sheet itself is used as a reinforcing material.

EXAMPLES

The present invention will be more specifically described in the following examples. However, the following examples are not intended to limit the scope of the present invention.

Example 1

[Production of Phosphorylated Pulp]

The needle bleached kraft pulp manufactured by Oji Paper Co., Ltd. (solid content: 93% by mass; basis weight: 208 g/m$^2$, sheet-shaped; and Canadian Standard Freeness (CSF) measured according to JIS P 8121 after defibration is 700 ml) was used as a raw material pulp. A phosphorylation treatment was performed on this raw material pulp as follows. First, a mixed aqueous solution of ammonium dihydrogen phosphate and urea was added to 100 parts by mass (absolute dry mass) of the above raw material pulp, and the obtained mixture was adjusted to result in 45 parts by mass of the ammonium dihydrogen phosphate, 120 parts by mass of the urea and 150 parts by mass of water, so as to obtain a chemical-impregnated pulp. Subsequently, the obtained chemical-impregnated pulp was heated in a hot-air dryer at 165° C. for 200 seconds, so that phosphoric acid groups were introduced into cellulose in the pulp, thereby obtaining a phosphorylated pulp.

Subsequently, a washing treatment was performed on the obtained phosphorylated pulp. The washing treatment was carried out by repeating the operation to pour 10 L of ion exchange water onto 100 g (absolute dry mass) of the phosphorylated pulp to obtain a pulp dispersed solution, which was then uniformly dispersed by stirring, followed by filtration and dehydration. The washing was terminated at a time point at which the electric conductivity of the filtrate became 100 μS/cm or less.

Subsequently, a neutralization treatment was performed on the phosphorylated pulp after the washing as follows. First, the phosphorylated pulp after the washing was diluted with 10 L of ion exchange water, and then, while stirring, a 1 N sodium hydroxide aqueous solution was slowly added to the diluted solution to obtain a phosphorylated pulp slurry having a pH value of 12 or more and 13 or less. Thereafter, the phosphorylated pulp slurry was dehydrated, so as to obtain a neutralized phosphorylated pulp.

Subsequently, the above-described washing treatment was performed on the phosphorylated pulp after the neutralization treatment. The infrared absorption spectrum of the thus obtained phosphorylated pulp was measured by FT-IR. As a result, absorption based on the phosphoric acid groups was observed around 1230 $cm^{-1}$, and thus, addition of the phosphoric acid groups to the pulp was confirmed. Moreover, the obtained phosphorylated pulp was analyzed using an X-ray diffractometer. As a result, it was confirmed that there were typical peaks at two positions near 2θ=14° or more and 17° or less, and near 2θ=22° or more and 23° or less. Thus, the phosphorylated pulp was confirmed to have cellulose type I crystals.

[Defibration Treatment]

Ion exchange water was added to the obtained phosphorylated pulp, so as to prepare a slurry having a solid concentration of 2% by mass. This slurry was treated using a wet atomization apparatus (manufactured by Sugino Machine Limited, Star Burst) at a pressure of 200 MPa twice to obtain an ultrafine cellulose fiber-dispersed solution A comprising ultrafine cellulose fibers. It was confirmed according to X-ray diffraction that these ultrafine cellulose fibers maintained cellulose type I crystals. Moreover, the fiber width of the ultrafine cellulose fibers was measured using a transmission electron microscope. As a result, the fiber width was 3 to 5 nm. Besides, the amount of phosphoric acid groups (the amount of strongly acidic groups) measured by the after-mentioned measurement method was 1.45 mmol/g.

[Dissolving of Polyethylene Oxide]

Polyethylene oxide (manufactured by SUMITOMO SEIKA CHEMICALS CO., LTD.; PEO-18) was added to ion exchange water to result in an amount of 1% by mass, and the mixture was then stirred for 1 hour, so that polyethylene oxide was dissolved therein. Thus, a polyethylene oxide aqueous solution was obtained.

[Dissolving of Citric Acid]

Citric acid (manufactured by Wako Pure Chemical Industries, Ltd.) was added to ion exchange water to result in an amount of 0.5% by mass, and the mixture was then stirred for 15 minutes for dissolution. Thus, a citric acid aqueous solution was obtained.

[Production of Ultrafine Cellulose Fiber-Containing Sheet]

The ultrafine cellulose fiber-dispersed solution A and the above-described polyethylene oxide aqueous solution were each diluted with ion exchange water to result in a solid concentration of 0.5% by mass. Subsequently, 20 parts by mass of the diluted polyethylene oxide aqueous solution was added to 100 parts by mass of the diluted ultrafine cellulose fiber-dispersed solution to obtain a mixed solution A. At this time, the pH of the mixed solution A was pH 8.74. Thereafter, 400 g of the mixed solution A obtained in the above-described procedures was weighed, and 2.9 g of the above-described citric acid aqueous solution was then added thereto, so as to obtain a coating solution with an adjusted pH value. At this time, the pH of the coating solution was pH 7.02. Subsequently, the coating solution was weighed, so that the finished basis weight of the sheet became 50 g/$m^2$, was then developed onto a commercially available transparent acrylic plate, and it was dried with a constant-temperature dryer at 50° C. In order to obtain the predetermined basis weight, a damming frame (inside dimension: 180 mm×180 mm, height: 50 mm) was arranged on the acrylic plate. The dried sheet was detached from the above-described acrylic plate to obtain an ultrafine cellulose fiber-containing sheet.

Example 2

[Dissolving of L-Tartaric Acid]

L-tartaric acid (manufactured by Wako Pure Chemical Industries, Ltd.) was added to ion exchange water to result in an amount of 0.5% by mass, and the mixture was then stirred for 15 minutes for dissolution. Thus, an L-tartaric acid aqueous solution was obtained.

A sheet was obtained in the same manner as that of Example 1, with the exception that 2.7 g of the L-tartaric acid aqueous solution was added to the mixed solution A used in [Production of ultrafine cellulose fiber-containing sheet] of Example 1 to obtain a coating solution having an adjusted pH value. It is to be noted that the pH of the coating solution at this time was pH 7.00.

Example 3

[Dissolving of DL-Malic Acid]

DL-malic acid (manufactured by Wako Pure Chemical Industries, Ltd.) was added to ion exchange water to result in an amount of 0.5% by mass, and the mixture was then stirred for 15 minutes for dissolution. Thus, a DL-malic acid aqueous solution was obtained.

A sheet was obtained in the same manner as that of Example 1, with the exception that 3.0 g of the DL-malic acid aqueous solution was added to the mixed solution A used in [Production of ultrafine cellulose fiber-containing sheet] of Example 1 to obtain a coating solution having an adjusted pH value. It is to be noted that the pH of the coating solution at this time was pH 7.02.

Example 4

[Dilution of Phosphoric Acid]

A phosphoric acid aqueous solution (manufactured by Wako Pure Chemical Industries, Ltd.) was added to ion exchange water to result in a phosphoric acid concentration of 0.5% by mass, and the obtained mixture was then stirred for 15 minutes for dilution. Thus, a 0.5-mass-% phosphoric acid aqueous solution was obtained.

A sheet was obtained in the same manner as that of Example 1, with the exception that 5.3 g of the phosphoric acid aqueous solution was added to the mixed solution A used in [Production of ultrafine cellulose fiber-containing sheet] of Example 1 to obtain a coating solution having an adjusted pH value. It is to be noted that the pH of the coating solution at this time was pH 7.02.

Example 5

[Dilution of Hydrochloric Acid]

A hydrochloric acid aqueous solution (manufactured by Wako Pure Chemical Industries, Ltd.) was added to ion exchange water to result in a hydrochloric acid concentration of 0.5% by mass, and the obtained mixture was then stirred for 15 minutes for dilution. Thus, a 0.5-mass-% hydrochloric acid aqueous solution was obtained.

A sheet was obtained in the same manner as that of Example 1, with the exception that 3.0 g of the hydrochloric acid aqueous solution was added to the mixed solution A used in [Production of ultrafine cellulose fiber-containing sheet] of Example 1 to obtain a coating solution having an adjusted pH value. It is to be noted that the pH of the coating solution at this time was pH 7.00.

Example 6

[Dissolving of Magnesium Sulfate]

Magnesium sulfate heptahydrate (manufactured by Kanto Chemical Co., Inc.) was added to ion exchange water to result in an amount of 0.5% by mass, and the mixture was then stirred for 15 minutes for dissolution. Thus, a magnesium sulfate aqueous solution was obtained.

A sheet was obtained in the same manner as that of Example 1, with the exception that 45.3 g of the magnesium sulfate aqueous solution was added to the mixed solution A used in [Production of ultrafine cellulose fiber-containing sheet] of Example 1 to obtain a coating solution having an adjusted pH value. It is to be noted that the pH of the coating solution at this time was pH 7.00.

Example 7

[Dissolving of Polyvinyl Alcohol]

Polyvinyl alcohol (manufactured by KURARAY CO., LTD.; POVAL 105; polymerization degree: 500; and saponification value: 98 to 99 mol %) was added to ion exchange water to result in an amount of 20% by mass, and the mixture was then stirred at 95° C. for 1 hour for dissolution. Thus, a polyvinyl alcohol aqueous solution was obtained.

[Production of Ultrafine Cellulose Fiber-Containing Sheet]

The ultrafine cellulose fiber-dispersed solution A and the above-described polyvinyl alcohol aqueous solution were each diluted with ion exchange water to result in a solid concentration of 0.5% by mass. Subsequently, 70 parts by mass of the diluted polyvinyl alcohol aqueous solution was added to 30 parts by mass of the diluted ultrafine cellulose fiber-dispersed solution to obtain a mixed solution B. At this time, the pH of the mixed solution B was pH 8.15. Thereafter, 400 g of the mixed solution B obtained in the above-described procedures was weighed, and 1.8 g of the above-described citric acid aqueous solution was then added thereto, so as to obtain a coating solution with an adjusted pH value. At this time, the pH of the coating solution was pH 7.03. Subsequently, the coating solution was weighed, so that the finished basis weight of the sheet became 50 g/m$^2$, and it was developed onto a commercially available transparent acrylic plate, and was then dried with a constant-temperature dryer at 50° C. In order to obtain the predetermined basis weight, a damming frame (inside dimension: 180 mm×180 mm, height: 50 mm) was arranged on the acrylic plate. The dried sheet was detached from the above-described acrylic plate to obtain an ultrafine cellulose fiber-containing sheet.

Comparative Example 1

A sheet was obtained in the same manner as that of Example 1, with the exception that the sheet was formed without adjusting the pH of the mixed solution A.

Comparative Example 2

A sheet was obtained in the same manner as that of Example 7, with the exception that the sheet was formed without adjusting the pH of the mixed solution B.

Comparative Example 3

[Dissolving of Aluminum Sulfate]

Aluminum sulfate 14-18 hydrate (manufactured by Kanto Chemical Co., Inc.) was added to ion exchange water, so that the purity of aluminum sulfate became 5% by mass, and the obtained mixture was then stirred for 15 minutes for dissolution. Thus, an aluminum sulfate aqueous solution was obtained.

[Dissolving of Sodium Acetate]

Sodium acetate (Kanto Chemical Co., Inc.) was added to ion exchange water to result in an amount of 10% by mass, and the obtained mixture was then stirred for 15 minutes for dissolution. Thus, a sodium acetate aqueous solution was obtained.

An ultrafine cellulose fiber-containing sheet was obtained in the same manner as that of Comparative Example 1, using the mixed solution A. The obtained ultrafine cellulose fiber-containing sheet was immersed in the above-described aluminum sulfate aqueous solution for 30 minutes. Thereafter, this sheet was immersed in ion exchange water for 15 minutes for washing. This washing was repeated twice, and the resulting sheet was then immersed in the above-described sodium acetate aqueous solution for 30 minutes. Subsequently, this sheet was immersed in ion exchange water for 15 minutes for washing. This washing was repeated twice, and the resulting sheet was attached to an acrylic plate, and was then dried in a chamber at 35° C. at a relative humidity of 15%, so as to obtain a sheet.

[Measurement]

[Measurement of pH of Sheet Coating Solution]

The pH of a sheet coating solution was measured using a corrected handy pH meter (manufactured by HORIBA, Ltd., D-51S).

[pH of Surface of Sheet]

The pH of the surface of the sheet was measured using a corrected pH meter (manufactured by HORIBA, Ltd., F-53).

[Haze of Sheet]

The haze was measured in accordance with JIS K 7136, using a hazemeter (manufactured by MURAKAMI COLOR RESEARCH LABORATORY Co., Ltd.; HM-150).

[Yellowness of Sheet Before and After Heating]

The yellowness (YI) of the sheet before and after heating was measured in accordance with JIS K 7373, using Colour Cute i (manufactured by Suga Test Instruments Co., Ltd.). It is to be noted that the yellowness of the sheet after heating was measured, after the sheet had been hot-pressed at 180° C. at 0.5 MPa for 1 minute, using a Mini Test Press (manufactured by AIDA ENGINEERING, LTD.). In addition, the changed amount of the yellowness, $\Delta YI$, was calculated according to the following equation:

$\Delta YI$=(yellowness of the sheet after heating)−(yellowness of the sheet before heating).

Moreover, the YI increase percentage was calculated according to the following equation:

YI increase percentage (%)=$\Delta YI$/(yellowness of the sheet before heating)×100.

[Evaluation of Long-Term Weather Resistance]

The sheets produced in the Examples and Comparative Examples were each cut into a 5-cm square piece, which was then left at rest under high temperature and high humidity conditions of 85° C. and a relative humidity of 85% for 10 days. Before and after the piece was left at rest for 10 days, the yellowness (YI) and the haze were measured, and the YI increase percentage and the haze increase percentage were then calculated. The sheets were evaluated under the evaluation criteria as mentioned below.

The YI increase percentage was calculated according to the following equation:

YI increase percentage (%)=(yellowness of the sheet after being left at rest under high temperature and high humidity conditions for 10 days–yellowness of the sheet before being left at rest under high temperature and high humidity conditions)/(yellowness of the sheet before being left at rest under high temperature and high humidity conditions)×100.

In addition, the haze increase percentage was calculated according to the following equation:

Haze increase percentage (%)=(haze after being left at rest under high temperature and high humidity conditions for 10 days–haze before being left at rest under high temperature and high humidity conditions)/(haze before being left at rest under high temperature and high humidity conditions)×100

⊙: Both the YI increase percentage and the haze increase percentage are 0% or more and less than 500%.
○: Either one or both of the YI increase percentage and the haze increase percentage are 500% or more and less than 1500% (provided that both the YI increase percentage and the haze increase percentage do not exceed 1500%).
Δ: Either one or both of the YI increase percentage and the haze increase percentage are 1500% or more.

The sheets obtained in the Examples were not deteriorated, after the sheets had been left for a long period of time under high temperature and high humidity conditions, and were excellent in terms of weather resistance.

On the other hand, the sheets obtained in the Comparative Examples were deteriorated, after the sheets had been left for a long period of time under high temperature and high humidity conditions, and were poor in terms of weather resistance. In particular, in Comparative Example 2 having a high content of resin, the sheet had poor weather resistance. In Comparative Example 3, after the formation of the sheet, the sheet was immersed in an aqueous solution of aluminum sulfate and was then immersed in an aqueous solution of sodium acetate.

The invention claimed is:

1. A sheet comprising cellulose fibers having a fiber width of 1000 nm or less, wherein
the cellulose fibers have anionic functional groups, and
the YI increase percentage calculated according to the following equation is 1500% or less:

YI increase percentage (%)=(yellowness of the sheet after heating–yellowness of the sheet before heating)/yellowness of the sheet before heating× 100, wherein the yellowness of the sheet after heating is a yellowness measured in accordance with JIS K 7373, after the sheet is subjected to hot pressing at 180° C. at 0.5 MPa for 1 minute, whereas the yellowness of the sheet before heating is a yellowness measured in accordance with JIS K 7373, before the sheet is subjected to the hot pressing.

2. The sheet according to claim 1, wherein the pH of the surface of the sheet is pH 6.00 or more and pH 8.00 or less.

3. The sheet according to claim 1, wherein the haze is 10.0% or less.

4. The sheet according to claim 1, wherein the content of the cellulose fibers is 50% by mass or more, with respect to the total solid mass in the sheet.

5. The sheet according to claim 1, which comprises a resin, wherein the resin is at least one type selected from a polyol resin, a polyether resin, and a cellulose derivative.

6. The sheet according to claim 1, comprising an acid component.

7. The sheet according to claim 6, wherein the acid component is at least one type selected from organic acid, inorganic acid, and the salts thereof.

TABLE 1

| | Mixing ratio (mass ratio) | Acid component | pH of coating solution | Content (mass %) of acid component in sheet | pH of sheet surface | Thickness (nm) | Haze | YI before heating | YI after heating | ΔYI | YI increase percentage | Evaluation (long-term weather resistance) |
|---|---|---|---|---|---|---|---|---|---|---|---|---|
| Ex. 1 | CNF/PEO = 100/20 | Citric acid | 7.02 | 0.65 | 6.54 | 32.7 | 0.5 | 0.63 | 5.99 | 5.36 | 851% | ⊙ |
| Ex. 2 | CNF/PEO = 100/20 | L-tartaric acid | 7.00 | 0.6 | 6.50 | 28.6 | 0.4 | 0.42 | 4.15 | 3.73 | 888% | ⊙ |
| Ex. 3 | CNF/PEO = 100/20 | DL-malic acid | 7.02 | 0.67 | 6.34 | 33.0 | 0.6 | 0.48 | 5.2 | 4.72 | 983% | ⊙ |
| Ex. 4 | CNF/PEO = 100/20 | Phosphoric acid | 7.02 | 1.18 | 6.48 | 35.8 | 0.6 | 0.65 | 7.95 | 7.3 | 1123% | ○ |
| Ex. 5 | CNF/PEO = 100/20 | Hydrochloric acid | 7.00 | 0.67 | 6.55 | 34.2 | 0.7 | 0.53 | 3.05 | 2.52 | 475% | ⊙ |
| Ex. 6 | CNF/PEO = 100/20 | Magnesium sulfate | 7.00 | 9.16 | 5.88 | 34.1 | 4.3 | 0.54 | 7.8 | 7.26 | 1344% | ○ |
| Ex. 7 | CNF/PVA = 30/70 | Citric acid | 7.03 | 0.40 | 6.52 | 34.2 | 0.5 | 0.52 | 7.98 | 7.46 | 1435% | ○ |
| Comp. Ex. 1 | CNF/PEO = 100/20 | — | 8.74 | 0.00 | 8.20 | 38.6 | 0.5 | 0.7 | 14.1 | 13.4 | 1914% | Δ |
| Comp. Ex. 2 | CNF/PVA = 30/70 | — | 8.15 | 0.00 | 7.97 | 33.6 | 0.3 | 0.54 | 23.7 | 23.16 | 4289% | Δ |
| Comp. Ex. 3 | CNF/PEO = 100/20 | Aluminum sulfate | 8.74 | — | 5.60 | 36.8 | 0.4 | 0.57 | 11.3 | 10.73 | 1882% | Δ |

* In Comparative Example 3, the sheet was treated with aluminum sulfate + sodium acetate after sheet formation.

8. The sheet according to claim 6, wherein the content of the acid component is 0.3% by mass or more and 15% by mass or less.

* * * * *